United States Patent [19]
Eberhardt

[11] 3,726,308
[45] Apr. 10, 1973

[54] SUCTION CHECK VALVE FOR PUMPS
[75] Inventor: H. Alfred Eberhardt, Paoli, Pa.
[73] Assignee: Hale Fire Pump Company, Conshohocken, Pa.
[22] Filed: Dec. 9, 1971
[21] Appl. No.: 206,340

[52] U.S. Cl. .............137/527.8, 29/156.7, 29/157.1, 251/298, 415/216
[51] Int. Cl. ..........................F16k 15/00, B21k 1/20
[58] Field of Search....................137/520, 521, 527, 137/527.2, 527.4, 527.6, 527.8; 251/298, 305, 333

[56] References Cited
UNITED STATES PATENTS

| | | | |
|---|---|---|---|
| 474,843 | 5/1892 | Mahan | 137/527.8 X |
| 2,913,001 | 11/1959 | Maslow et al. | 137/527.4 |
| 2,927,596 | 3/1960 | Carlson | 137/527.6 X |
| 2,969,492 | 1/1961 | Wheatley | 137/527.8 X |
| 2,998,957 | 9/1961 | Vulliez | 137/527.8 X |

Primary Examiner—Martin P. Schwadron
Assistant Examiner—David J. Zobkiw
Attorney—Dexter N. Shaw et al.

[57] ABSTRACT

A centrifugal pump assembly comprising a main body having at least one pair of side by side impeller chambers, an impeller rotatably mounted in each chamber, at least one inlet manifold, at least one discharge manifold, a discharge passage connecting the discharge side of each impeller with said discharge manifold, a bypass passage connecting the discharge side of one of said impellers with the inlet side of the other of said impellers, a transfer valve operable in first position to connect discharge side of said one impeller directly to said discharge manifold and in a second position to connect the discharge side of said one impeller to the inlet side of said other impeller, a valve seat in the inlet manifold, at least one check valve in the inlet manifold of said other impeller operable between a closed position when said transfer valve is in a first position and on open position when said transfer valve is in said second position, said check valve including an arcuate wall portion having a pair of parallel top and bottom end surfaces which lie in a circumference of a common circle and a pair of generally oval-shaped side wall portions disposed generally transversely to said arcuate wall portion from opposite side edges thereof, the outer edges of the side walls lying on the circumference of said common circle.

2 Claims, 9 Drawing Figures

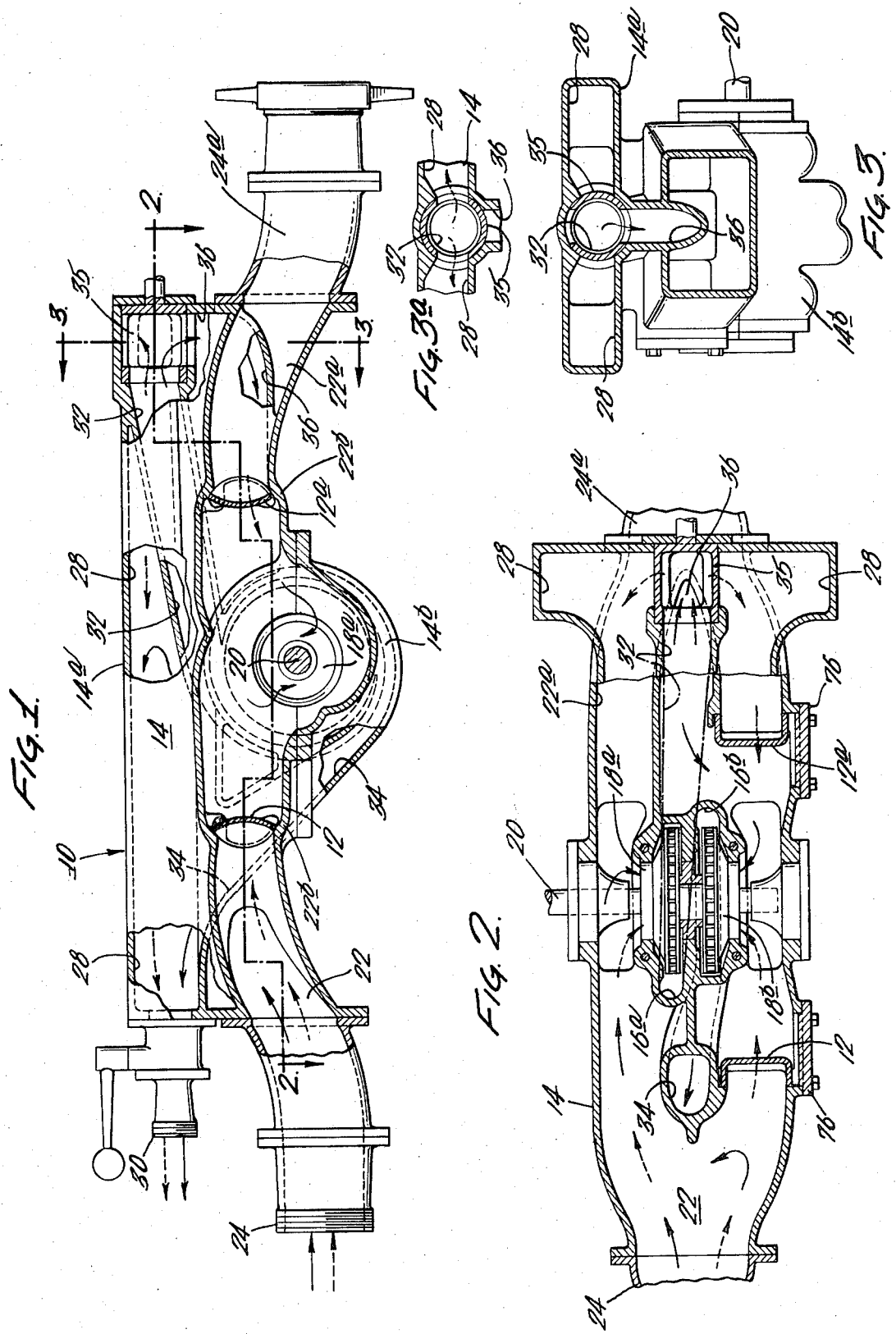

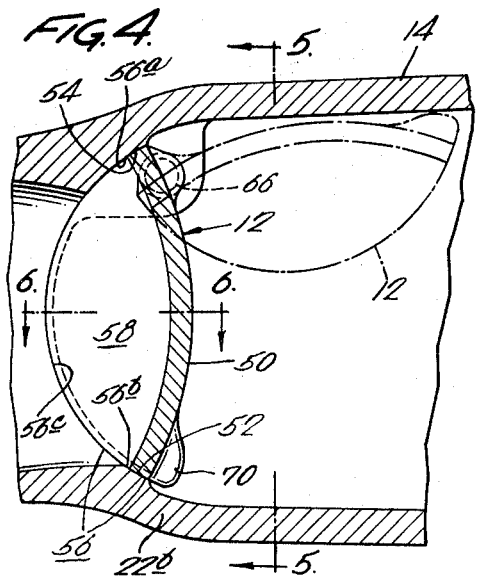
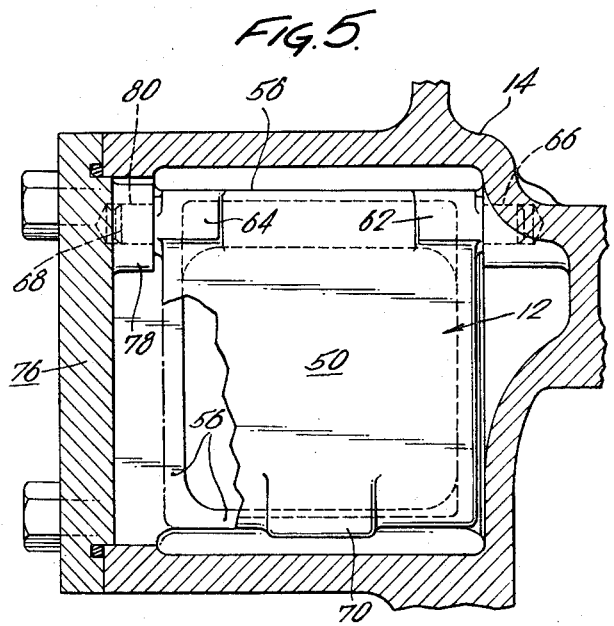
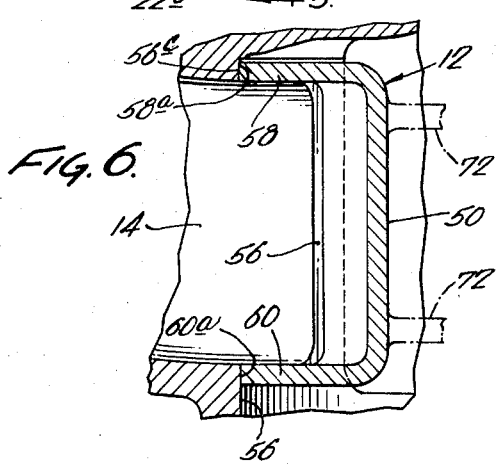
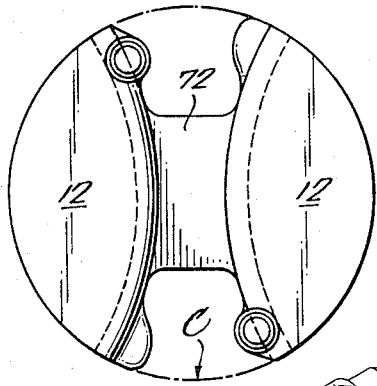
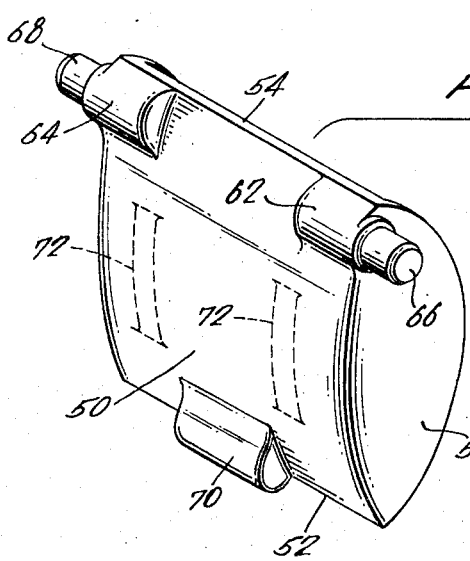
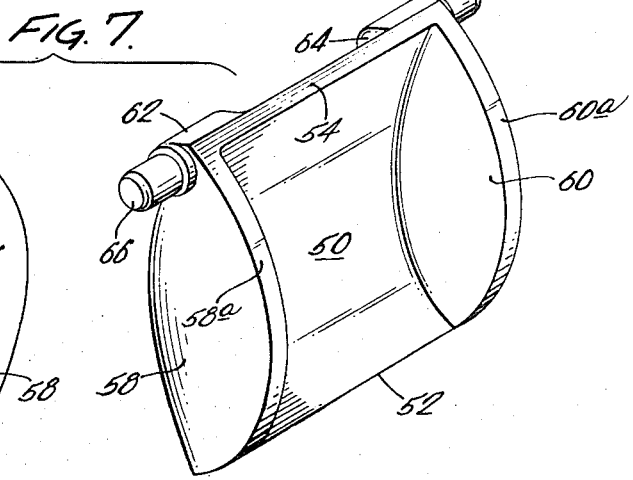

SUCTION CHECK VALVE FOR PUMPS

The present invention relates to centrifugal pumps and more particularly to a novel type of check valve for use in centrifugal pumps. The check valve is particularly adapted for use in mobile pumps of the multi-stage type such as those used on fire fighting equipment to deliver water under high pressure to hose lines.

These pumps generally comprise a multi-section housing having at least two impellers therein, a series of check valves, and a transfer valve which cooperatively combine to permit selective operation of the pump as a multi-service two-stage series or parallel pump. For example, in one position of the transfer valve, the inlet lines to the impellers feed each impeller in parallel and the discharge from each impeller is in parallel. In this manner the quantity delivery of the pump at the discharge side is twice that at the inlet side and the pressure is raised, for example from 0 to a predetermined level, for example, 125 pounds pressure. The pump can be converted to series operation simply by actuation of the transfer valve which automatically effects closing of the flap-type check valves so that the discharge from the first impeller is directed into the inlet of the second impeller, and then from the second impeller to the discharge outlet. In this instance, the flow rate at the inlet and discharge side of each impeller are the same, except that the fluid is delivered at twice the pressure as in the previous example.

These flap-type check valves have certain disadvantages and drawbacks, particularly in large size centrifugal pumps. For example, it is necessary to sectionalize the housing of the pump and provide a joint at the location of the check valves. This adds to the overall cost of manufacturing and assembly of the pump. Additionally, it has been found that these flap-type valves tend to slam shut noisily when the transfer valve is actuated from parallel position to a series position.

With the above in mind, an object of the present invention is to provide a new and improved type of check valve, particularly suitable for large pumps, which does not require sectionalizing the housing for the pump and which is further characterized by novel features of construction and arrangement whereby the valve tends to close quietly and in a manner whereby it does not slam against the valve seat, thereby extending its life and reducing noise.

Another object of the present invention is to provide a pump wherein substantially the entire casing is a one-piece casting which facilitates machining of the valve seats and assembly of the check valve.

Still another object is to provide a check valve which may be cast in pairs and wherein finishing operations are maintained to a minimum.

A further object is to provide a check valve assembly wherein the valve fits snugly in the seat.

These and other objects of the present invention and the various features and details of the construction, installation and operation of a suction check valve in accordance with the present invention are more fully set forth and described with reference to the accompanying drawings, wherein:

FIG. 1 is a side elevational view of a centrifugal pump incorporating a suction check valve in accordance with the present invention, the pump having parts broken away so that the internal construction and flow paths may be seen more clearly;

FIG. 2 is a fragmentary sectional view taken on line 2—2 of FIG. 1;

FIG. 3 is a sectional view taken on line 3—3 of FIG. 1;

FIG. 3a is a fragmentary section of a portion of FIG. 3 illustrating a different adjustment of the transfer valve;

FIG. 4 is an enlarged fragmentary sectional view of a suction check valve in accordance with the present invention;

FIGS. 5 and 6 are sectional views of the valve taken on lines 5—5 and 6—6 of FIG. 4 respectively;

FIG. 7 is a perspective view of the valve itself as viewed from the front and from the back; and FIG. 8 is an end elevational view illustrating a method of combining two valve elements in a single casting in order to facilitate accurate machining thereof.

Referring now to the drawings and particularly to FIG. 1 thereof, there is illustrated a centrifugal pump generally designated by the numeral 10 incorporating, in the present instance, a pair of suction check valves 12, 12a constructed in accordance with the present invention. Even though the pump illustrated is a two-stage centrifugal pump, it is to be understood that the suction check valve of the present invention has other applications in other types of pumps an in other installations where check valves are employed.

In the present instance the pump comprises a main body or casing 14 consisting of an upper section 14a and a lower section 14b, the casing being formed with a pair of side-by-side impeller chambers 16a, 16b for impellers 18a, 18b mounted on an impeller shaft 20 rotatably supported in the side walls of the pump casing. The pump casing is provided with one or more inlet or suction manifolds 22, 22a adapted to be connected by conduits 24, 24a to a suitable source of water supply. The impeller shaft is adapted to be connected to suitable drive means as illustrated in U.S. Pat. No. 3,500,961 to drive the impellers. The casing further includes a discharge manifold 28 and a discharge conduit 30 to which hose lines or the like may be connected.

Suitable interconnecting passageways, chambers and the like are provided in the pump casing so that in the operation of the pump, upon rotation of the impellers, flow of fluid is effected through the pump from the source to the discharge manifold 28. Accordingly, low pressure water entering the pump through the inlet conduit 24 is converted by the impeller and its attendant passages to high pressure water discharged at the discharge conduit 30 to supply a plurality of hose lines connected thereto.

For example, the outlet of the first stage impeller chamber 16a is connected through a discharge passage 32 to the discharge manifold 28 and the outlet of the second stage impeller chamber 16b is connected by a discharge passage 34 to the discharge manifold 28. A transfer valve 35 is positioned at the juncture of the first stage discharge passage 32, the discharge manifold 28, and a bypass passage 36. In the pump illustrated, the check valves 12 and 12a are located in the inlet manifolds 22 and 22a on either side of the inlet side of second stage impeller chamber 16b.

Consider now briefly the operation of the pump and assume that the transfer valve 35 is in the position shown in FIG. 3 wherein the discharge passage 32 from the first stage impeller chamber is closed to the main discharge manifold 28 and is connected to the bypass passage 36 to establish communication with the inlet side of the second stage impeller 18b. In this instance, flow of fluid through the pump, which is indicated by the solid arrows in the drawings, flows to the inlet side of the first stage impeller 16a where it is discharge to the discharge passage 32 through the transfer valve 35 and bypass passage 36 to the inlet side of the second stage impeller 18b. There the fluid is discharged through the discharge passage 34 of the second stage to the main discharge manifold 28. It is noted that flow of fluid from the inlet manifold 22 to the second stage impeller is closed since the check valves 12 and 12a are in a closed position by reason of the pressure differential on either side of the valves 12 and 12 a. In this instance, fluid delivered at the rate, for example of 375 gallons per minute at zero pressure at the inlet conduit is discharged at the same rate; namely 375 gallons per minute and at a pressure of 250 pounds.

The pump may be converted to parallel operation simply by actuating the transfer valve 35 to the position shown in FIG. 3a wherein the discharge passage 32 of the first stage communicates directly through the ports of the transfer valve with the discharge manifold 28, and flow to the bypass passage 36 is shut off. In this instance, the check valves are in an open position and the fluid from the inlet manifold 22 is directed into the inlet side of the first and second stage impellers as indicated by the broken arrows in the drawings. The flow from the impeller chambers is directed to the discharge manifold 28 through the discharge passages 32 and 34 of the first and second stage manifolds respectively. In this instance, water at zero pressure at the inlet manifold supplied at the rate of 375 gallons per minute is discharged at the discharge manifold at 750 gallons per minute and at 125 pounds pressure. Accordingly, as is conventional when greater volume is required, the pump is set for parallel operation and, when greater pressures are required, the pump is set for series operation.

Considering now the specific details of the check valve in accordance with the present invention, the valve as illustrated consists of a slightly curved, arcuate wall portion 50 having parallel end surfaces 52 and 54 which, as illustrated, lie in a circumference of a common circle C (see FIG. 8), these end edges engaging the valve seat 56 as illustrated in FIG. 4. The valve further includes a pair of generally oval-shaped side walls 58 and 60 which project transversely to the wall portion 50 from opposite side edges, the outer trace of the side walls lying on the circumference of the circle C and merging with the end surfaces 52 and 54 of the wall portion 50. The valve seat is machined to define a similar arcuate surface so that the end edges 52 and 54 engage simultaneously with a portion of the outer edges of the side walls as illustrated. The valve is formed with a pair of raised lugs 62 and 64 having formed integrally therewith a pair of stub shafts 66 and 68 which pivotally support the check valve in the casing of the pump in the manner illustrated in FIG. 5. The bottom edge of the valve also has a raised rib 70 which, as illustrated in FIG. 4, prevents engagement of the wall portion 50 of the valve when it is actuated to an open position. The rib 70 also serves as a counterweight to insure complete closing of the valve without the necessity of having to mount the valve in a non-vertical position relative to the valve seat 56.

The valve of the present invention is easy and economical to manufacture and requires a minimum amount of machining to insure an accurate fit with the seat in the casing. For example, as illustrated in FIG. 8, two valves may be cast simultaneously with the connecting webs 72, 72 severed after the edges 52 and 54 of each half have been finish machined. Of course, the symmetrical circular shape lends itself to machining or turning of the critical surfaces on a lathe. After machining, the webs are simply severed from the back face of the plate of each half.

Since the casing where the valve is installed is one piece, a seat is very simple to machine accurately, the opening in the side wall of the casing to facilitate machining being closed by a cover 76 which in turn is provided with a boss 78 having an opening 80 to receive one of the stub shafts and accurately position the valve in the casing.

It is noted that the stub shaft 68 seats loosely in the opening 80 to provide a degree of play and that the valve seats snugly in the closed position by reason of the fact that the valve seat 56 is finished on the same circumference as the end edges 52 and 54 of the valve. Thus, the valve seat includes upper and lower arcuate seat portions 56a and 56b, respectively, and parallel arcuate side seat portions 56c and 56d, respectively, disposed on either side of the inlet manifold, all of the seat portions being disposed on the circumference of a common circle so that the seat may be formed by a single machining operation. It is noted further that the circumference on which the seat portions lie is the same as the circumference of the edge portions of the valve. Thus, the valve is self-seating. It is noted that the valve seat 56 may be plunge bored by a simple and economical operation. In the embodiment illustrated, the inlet manifold 22 is offset as at 22a adjacent the valve seat to facilitate formation of the valve seat 56 and permit the check valve to be mounted in a manner so that it extends vertically in the closed position.

What is claimed is:

1. A valve adapted to be pivotally mounted in a hollow member or the like having a valve seat comprising an arcuate wall portion having a pair of parallel top and bottom end surfaces which lie in a circumference of a common circle and a pair of generally oval-shaped side wall portions disposed generally transversely to said arcuate wall portion from opposite side edges thereof, the outer edges of the side walls lying on the circumference of said common circle.

2. A valve as claimed in claim 1 wherein the arcuate wall portion is provided with a pair of oppositely projecting stub shafts adjacent the top end surface to facilitate pivotal mounting and including a rib on the wall portion adjacent the bottom end of the wall surface which serves as a counterweight tending to pivot the valve to a closed position when it is mounted vertically.

* * * * *